(12) United States Patent
Sakamoto et al.

(10) Patent No.: US 9,864,215 B1
(45) Date of Patent: Jan. 9, 2018

(54) SUBSTRATE-TYPE OPTICAL WAVEGUIDE AND SUBSTRATE-TYPE OPTICAL MODULATOR

(71) Applicant: FUJIKURA LTD., Tokyo (JP)

(72) Inventors: Shinichi Sakamoto, Sakura (JP); Kazuhiro Goi, Sakura (JP); Norihiro Ishikura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/658,871

(22) Filed: Jul. 25, 2017

(30) Foreign Application Priority Data

Aug. 30, 2016 (JP) .................. 2016-168268

(51) Int. Cl.
*G02F 1/025* (2006.01)
*G02F 1/225* (2006.01)

(52) U.S. Cl.
CPC ............ *G02F 1/025* (2013.01); *G02F 1/2255* (2013.01); *G02F 1/2257* (2013.01); *G02F 2201/063* (2013.01); *G02F 2201/127* (2013.01)

(58) Field of Classification Search
None
See application file for complete search history.

(56) References Cited

U.S. PATENT DOCUMENTS

| | | | |
|---|---|---|---|
| 8,149,493 B2 | 4/2012 | Chen | |
| 2005/0013522 A1* | 1/2005 | Doi | G02F 1/0121 385/3 |
| 2007/0280309 A1* | 12/2007 | Liu | G02F 1/025 372/26 |
| 2009/0290830 A1* | 11/2009 | Mitomi | G02F 1/0356 385/3 |
| 2010/0158428 A1* | 6/2010 | Kawano | G02F 1/0356 385/3 |
| 2011/0135241 A1* | 6/2011 | Shimizu | G02F 1/2255 385/2 |
| 2012/0033910 A1* | 2/2012 | Morini | G02F 1/025 385/3 |
| 2012/0087614 A1* | 4/2012 | Ishimura | G02F 1/2255 385/2 |
| 2012/0294563 A1* | 11/2012 | Thomson | G02F 1/025 385/2 |
| 2014/0233878 A1* | 8/2014 | Goi | G02F 1/2257 385/3 |
| 2015/0378238 A1* | 12/2015 | Matsumoto | G02F 1/2255 385/2 |

FOREIGN PATENT DOCUMENTS

| | | |
|---|---|---|
| JP | 2015-129906 A | 7/2015 |
| JP | 2015-148711 A | 8/2015 |

* cited by examiner

*Primary Examiner* — Mike Stahl
(74) *Attorney, Agent, or Firm* — Westerman, Hattori, Daniels & Adrian, LLP

(57) ABSTRACT

Provided is a substrate-type optical waveguide, having a phase modulation function, (i) in which a reflection of a signal to be inputted via a coplanar line is restrained and (ii) which consumes less power. In a case where the substrate-type optical waveguide is partitioned into a plurality of sections by cross sections orthogonal to a direction in which light propagates through a core, a local capacitance in each of the plurality of sections gradually increases as a distance from an entrance end surface increases.

7 Claims, 6 Drawing Sheets

SUBSTRATE-TYPE OPTICAL WAVEGUIDE AND SUBSTRATE-TYPE OPTICAL MODULATOR

This Nonprovisional application claims priority under 35 U.S.C. §119 on Patent Application No. 2016-168268 filed in Japan on Aug. 30, 2016, the entire contents of which are hereby incorporated by reference.

TECHNICAL FIELD

The present invention relates to a substrate-type optical waveguide having a phase modulation function. Moreover, the present invention relates to a substrate-type optical modulator which includes the substrate-type optical waveguide as a phase modulating section.

BACKGROUND ART

In the field of optical communications, there has been practically used a technique of realizing an optical modulator by employing a substrate-type optical waveguide. For example, a substrate-type optical waveguide having a phase modulation function can be realized by forming, in a core of the substrate-type optical waveguide, a P-type semiconductor region and an N-type semiconductor region. In such a substrate-type optical waveguide, an effective refractive index of the core changes in accordance with a signal voltage applied across the P-type semiconductor region and the N-type semiconductor region. To input a signal to the substrate-type optical waveguide, for example, a coplanar line is used which is provided on a surface of the substrate-type optical waveguide.

For example, Patent Literatures 1 through 3 each disclose a substrate-type optical waveguide having a phase modulation function.

CITATION LIST

Patent Literature

[Patent Literature 1]
Japanese Patent Application Publication Tokukai No. 2015-129906 (Publication date: Jul. 16, 2015)
[Patent Literature 2]
Japanese Patent Application Publication Tokukai No. 2015-148711 (Publication date: Aug. 20, 2015)
[Patent Literature 3]
Specification of U.S. Pat. No. 8,149,493 (Registration date: Apr. 3, 2012)

SUMMARY OF INVENTION

Technical Problem

In order to reduce electric power consumed by a substrate-type optical waveguide having a phase modulator, it is important to reduce a voltage (hereinafter referred to as "modulation voltage") Vpi, which is to be applied across the P-type semiconductor region and the N-type semiconductor region so that an effective refractive index of a core is controlled to have a certain value. The modulation voltage Vpi can be reduced by increasing a capacitance C of the substrate-type optical waveguide. The capacitance C can be increased by employing (i) a configuration in which a distance (i.e., a width of a depletion layer) between the P-type semiconductor region and the N-type semiconductor region is reduced by increasing carrier densities of respective of the P-type semiconductor region and the N-type semiconductor region or (ii) a configuration in which a section via which the P-type semiconductor region and the N-type semiconductor region face each other is lengthened.

However, a characteristic impedance of the substrate-type optical waveguide does not match an impedance of a circuit which is followed by the substrate-type optical waveguide, in a case where either of those configurations is employed and consequently the capacitance C of the substrate-type optical waveguide is increased. This causes a signal, which is to be inputted to the substrate-type optical waveguide via a coplanar line, to be reflected. A wave thus reflected adversely affects a driver circuit which serves as a source of the signal.

The present invention has been attained in view of the above problem, and an objective of the present invention is to provide a substrate-type optical waveguide, having a phase modulation function, (i) in which a reflection of a signal to be inputted via a coplanar line is restrained and (ii) which consumes less power.

Solution to Problem

A substrate-type optical waveguide in accordance with an aspect of the present invention includes: a lower cladding; a core, provided on an upper surface of the lower cladding, which has a P-type semiconductor region and an N-type semiconductor region; an upper cladding which is laminated on the lower cladding so that the core is buried in the upper cladding; and a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region, a local capacitance in each of a plurality of sections gradually increasing as a distance from an entrance end surface of the substrate-type optical waveguide increases, in a case where the substrate-type optical waveguide is partitioned into the plurality of sections by cross sections orthogonal to a direction in which light propagates through the core.

The above configuration makes it possible to reduce a global capacitance (i.e., an average of local capacitances of the respective plurality of sections) of the substrate-type optical waveguide. The global capacitance affects a modulation voltage of the substrate-type optical modulator, while maintaining a local capacitance, in the vicinity of the entrance end surface, of the substrate-type optical waveguide. The local capacitance affects a characteristic impedance of the substrate-type optical waveguide. This makes it possible to reduce the modulation voltage of the substrate-type optical waveguide while maintaining the characteristic impedance of the substrate-type optical waveguide. That is, it is possible to reduce electric power consumed by the substrate-type optical waveguide, while restraining a reflection of a signal to be inputted to the substrate-type optical waveguide via the coplanar line.

Advantageous Effects of Invention

According to an aspect of the present invention, it is possible to restrain a reflection of a signal, to be inputted via a coplanar line, while reducing electric power consumption.

BRIEF DESCRIPTION OF DRAWINGS (a) of FIG. 1 is a plan view of a substrate-type optical waveguide in accordance with an embodiment of the present invention. (b) of FIG. 1 is a cross-sectional view of the substrate-type optical waveguide taken along a line A-A' near an entrance end surface. (c) of FIG. 1 is a cross-sectional view of the substrate-type optical waveguide taken along a line B-B' near an exit end surface.

(a) of FIG. 2 is a plan view of a substrate-type optical waveguide in accordance with an example of the present invention. (b) of FIG. 2 is a plan view of a substrate-type optical waveguide in accordance with a comparative example.

(a) of FIG. 3 is a graph showing frequency dependencies of reflection coefficients S11 of the respective substrate-type optical waveguides illustrated in (a) and (b) of FIG. 2. (b) of FIG. 3 is a graph showing frequency dependencies of transmission coefficients S12 of the respective substrate-type optical waveguides illustrated in (a) and (b) of FIG. 2.

DESCRIPTION OF EMBODIMENTS

[Configuration of Substrate-Type Optical Waveguide]

Figure 1:
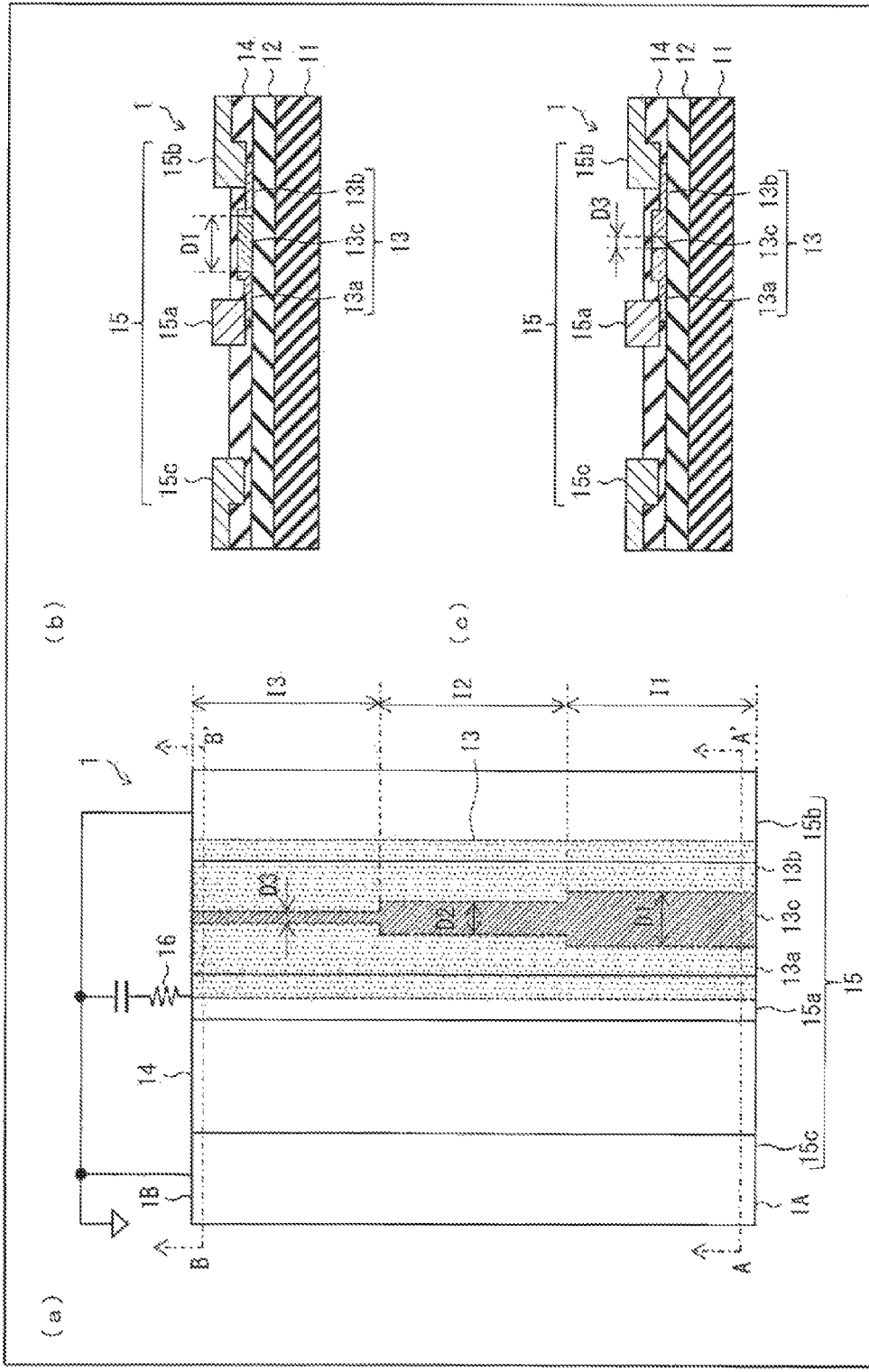

The following description will discuss, with reference to FIG. 1, a configuration of a substrate-type optical waveguide 1 in accordance with an embodiment of the present invention. (a) of FIG. 1 is a plan view of the substrate-type optical waveguide 1. (b) of FIG. 1 is a cross-sectional view of the substrate-type optical waveguide 1 taken along a line A-A' near an entrance end surface 1A. (c) of FIG. 1 is a cross-sectional view of the substrate-type optical waveguide 1 taken along a line B-B' near an exit end surface 1B. The substrate-type optical waveguide 1 illustrated in FIG. 1 is a substrate-type optical waveguide having a phase modulation function, and can also be regarded as a part of a substrate-type optical modulator.

The substrate-type optical waveguide 1 includes (i) a silicon substrate 11, (ii) a lower cladding 12 which is laminated on the silicon substrate 11, (iii) a core 13 which is provided on an upper surface of the lower cladding 12, (iv) an upper cladding 14 which is laminated on the lower cladding 12 so that the core 13 is buried in the upper cladding 14, and (v) a coplanar line 15 which is provided on an upper surface of the upper cladding 14 (see (b) and (c) of FIG. 1). The coplanar line 15 includes (i) a traveling-wave electrode 15a and (ii) a pair of earth conductors 15b and 15c between which the traveling-wave electrode 15a is sandwiched. In FIG. 1, the reference sign 1A indicates the entrance end surface of the substrate-type optical waveguide 1, and the reference sign 1B indicates the exit end surface of the substrate-type optical waveguide 1.

In order for the core 13 to serve as an optical waveguide, the lower cladding 12 and the upper cladding 14 are each made of a medium which has a refractive index lower than that of a medium of which the core 13 is made. In the present embodiment, the core 13 is made of silicon, and the lower cladding 12 and the upper cladding 14 are each made of silica which has a refractive index higher than that of silicon. With the configuration, in a case where light enters the core 13 via the entrance end surface 1A, it propagates from the entrance end surface 1A toward the exit end surface 1B while being confined within the core 13, and then exits the core 13 via the exit end surface 1B. The core 13 thus serves as an optical waveguide.

In the core 13, a P-type semiconductor region 13a and an N-type semiconductor region 13b are each provided across an entire section extending from the entrance end surface 1A to the exit end surface 1B so that the core 13, which serves as an optical waveguide, also serves as a phase modulator. The P-type semiconductor region 13a, which serves as a P-type semiconductor, is doped with a triad such as boron. The N-type semiconductor region 13b, which serves as an N-type semiconductor, is doped with a pentad such as phosphorous. One of the P-type semiconductor region 13a and the N-type semiconductor region 13b (in the present embodiment, the P-type semiconductor region 13a) is connected to the traveling-wave electrode 15a across the entire section extending from the entrance end surface 1A to the exit end surface 1B. The other (in the present embodiment, the N-type semiconductor region 13b) is connected to the earth conductor 15b across the entire section extending from the entrance end surface 1A to the exit end surface 1B. With the configuration, in a case where a signal voltage is applied across an entrance end (i.e., an end on an entrance end surface 1A side) of the traveling-wave electrode 15a, there is formed a depletion layer 13c having a width, which changes in accordance with the signal voltage, in the vicinity of a boundary between the P-type semiconductor region 13a and the N-type semiconductor region 13b. This causes an effective refractive index of the core 13 to change in accordance with the signal voltage. As such, in a case where signal light enters the core 13 via the entrance end surface 1A, the signal light is subjected to phase modulation while propagating through the core 13. The core 13 thus also serves as a phase modulator.

Note that in the present embodiment, (i) the core 13a is of a rib-slab type and (ii) a boundary surface between the P-type semiconductor region 13a and the N-type semiconductor region 13b is located within a rib of the core 13. The core of "rib-slab type" herein refers to a core which has a cross section of an inverted T-shape in a direction orthogonal to a direction in which light propagates through the core 13. The core of rib-slab type allows light, which propagates through the core 13, to be unevenly distributed in a center part (also referred to as a "rib") which is thicker than both end parts (also referred as "slabs"). Furthermore, the boundary surface between the P-type semiconductor region 13a and the N-type semiconductor region 13b is located within the rib of the core 13. This causes a region, in which light propagating through the core 13 is unevenly distributed, to overlap with a region in which the depletion layer 13c is formed. This makes it possible to more effectively carry out phase modulation with respect to light propagating through the core 13.

A first feature of the substrate-type optical waveguide 1 in accordance with the present embodiment resides in that a distance (i.e., a width of the depletion layer 13c) Dj, in a section Ij, between the P-type semiconductor region 13a and the N-type semiconductor region 13b decreases as a distance from the entrance end surface 1A increases, in a case where the substrate-type optical waveguide 1 is partitioned into a plurality of sections I1, I2, and I3 by cross sections orthogonal to the direction in which light propagates through the core 13, (see (a) of FIG. 1). This makes it possible to reduce a global capacitance C (i.e., an average of local capacitances Cj of respective sections Ij) of the substrate-type optical waveguide 1. The global capacitance C affects a modulation voltage Vpi of the substrate-type optical waveguide 1, while maintaining a local capacitance C1, in the vicinity of the entrance end surface 1A, of the substrate-type optical waveguide 1. The local capacitance C1 affects a characteristic impedance Z of the substrate-type optical waveguide 1. Consequently, it is possible to reduce the modulation voltage Vpi of the substrate-type optical waveguide 1 while maintaining the characteristic impedance Z of the substrate-type optical waveguide 1. As such, it is possible to reduce electric power consumed by the substrate-type optical waveguide 1, while restraining a reflection of a signal supplied to the substrate-type optical waveguide 1 via the coplanar line 15.

A second feature of the substrate-type optical waveguide 1 in accordance with the present embodiment resides in that a terminal resistor 16 is connected to an exit end (i.e., an end on an exit end surface 1B side) of the traveling-wave electrode 15a (see (a) of FIG. 1). As with the characteristic impedance Z of the substrate-type optical waveguide 1, a resistance RO of the terminal resistor 16 is set so as to match an impedance (e.g., 50Ω) of a circuit which is followed by the substrate-type optical waveguide 1.

In a low frequency domain (i.e., a frequency domain in which a wavelength is longer than a waveguide length of the substrate-type optical waveguide 1), an electromagnetic wave (signal), which is transmitted via the coplanar line 15, is propagated as if a local characteristic impedance Zj of the substrate-type optical waveguide 1 was not substantially changed. The local characteristic impedance Zj changes, for each section, in accordance with a distance Dj. It follows that no significant reflection occurs in the vicinity of the exit end surface 1B, provided that a distance D1 is set so that a local characteristic impedance Z1, in the vicinity of the entrance end surface 1A, of the substrate-type optical waveguide 1 matches the impedance (e.g., 50Ω) of the circuit which is followed by the substrate-type optical waveguide 1, even though a local characteristic impedance Z3, in the vicinity of the exit end surface 1B, of the substrate-type optical waveguide 1 does not match the terminal resistor 16, which local characteristic impedance Z3 is set in accordance with a distance D3. Therefore, in the low frequency domain, it is possible to restrain (i) a reflection which can occur in the vicinity of the entrance end surface 1A and (ii) a reflection which can occur in the vicinity of the exit end surface 1B.

In contrast, in a high frequency domain (i.e., a frequency domain in which the wavelength is shorter than the waveguide length of the substrate-type optical waveguide 1), an electromagnetic wave (signal) which is transmitted via the traveling-wave electrode 15a is propagated while being affected by a change in local characteristic impedance Zj of the substrate-type optical waveguide 1. The local characteristic impedance Zj changes, for each section, in accordance with the distance Dj. It follows that a significant reflection occurs in the vicinity of the exit end surface 1B, provided that the local characteristic impedance Z3, in the vicinity of the exit end surface 1B, of the substrate-type optical waveguide 1 does not match the terminal resistor 16, which local characteristic impedance Z3 is set in accordance with the distance D3, even though the distance D1 is set so that the local characteristic impedance Z1, in the vicinity of the entrance end surface 1A, of the substrate-type optical waveguide 1 matches the impedance (e.g., 50Ω) of the circuit which is followed by the substrate-type optical waveguide 1. Note, however, that a wave, reflected in the vicinity of the exit end surface 1B, will never cause a driver circuit (i.e., a signal source of a signal voltage) to be adversely affected. This is because, in the high frequency domain, a wave, reflected in the vicinity of the exit end surface 1B, is subjected to a sufficient attenuation (which is greater than an attenuation to which the wave is subjected in the low frequency domain) while propagating through the coplanar line 15 in an opposite direction.

Note that (a) of FIG. 1 illustrates an example configuration in which one of two terminals of the terminal resistor 16 is connected to the traveling electrode 15a, and the other one of the two terminals is connected, via a capacitor, to the earth conductor 15b and a ground. The present embodiment is, however, not limited as such. Alternatively, the present embodiment can be configured such that one terminal of the terminal resistor 16 is connected to the traveling-wave electrode 15a, and the other terminal of the terminal resistor 16 is merely connected to the earth conductor 15b via a capacitor. Alternatively, the present embodiment can be configured such that one terminal of the terminal resistor 16 is connected to the traveling-wave electrode 15a, and the other terminal of the terminal resistor 16 is merely connected to a ground via a capacitor.

[Effect of Substrate-Type Optical Waveguide]

Figure 2:
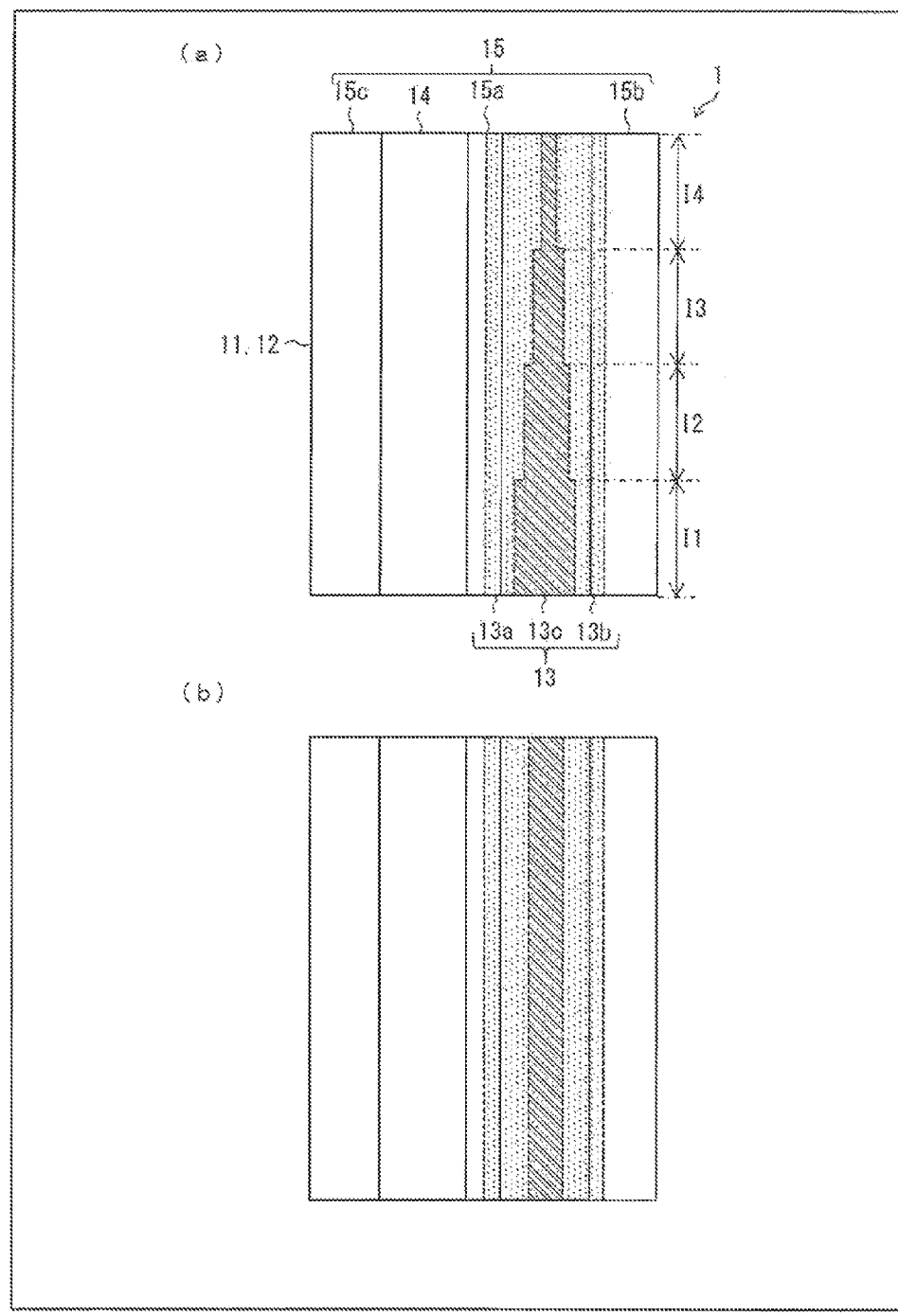
Figure 3:
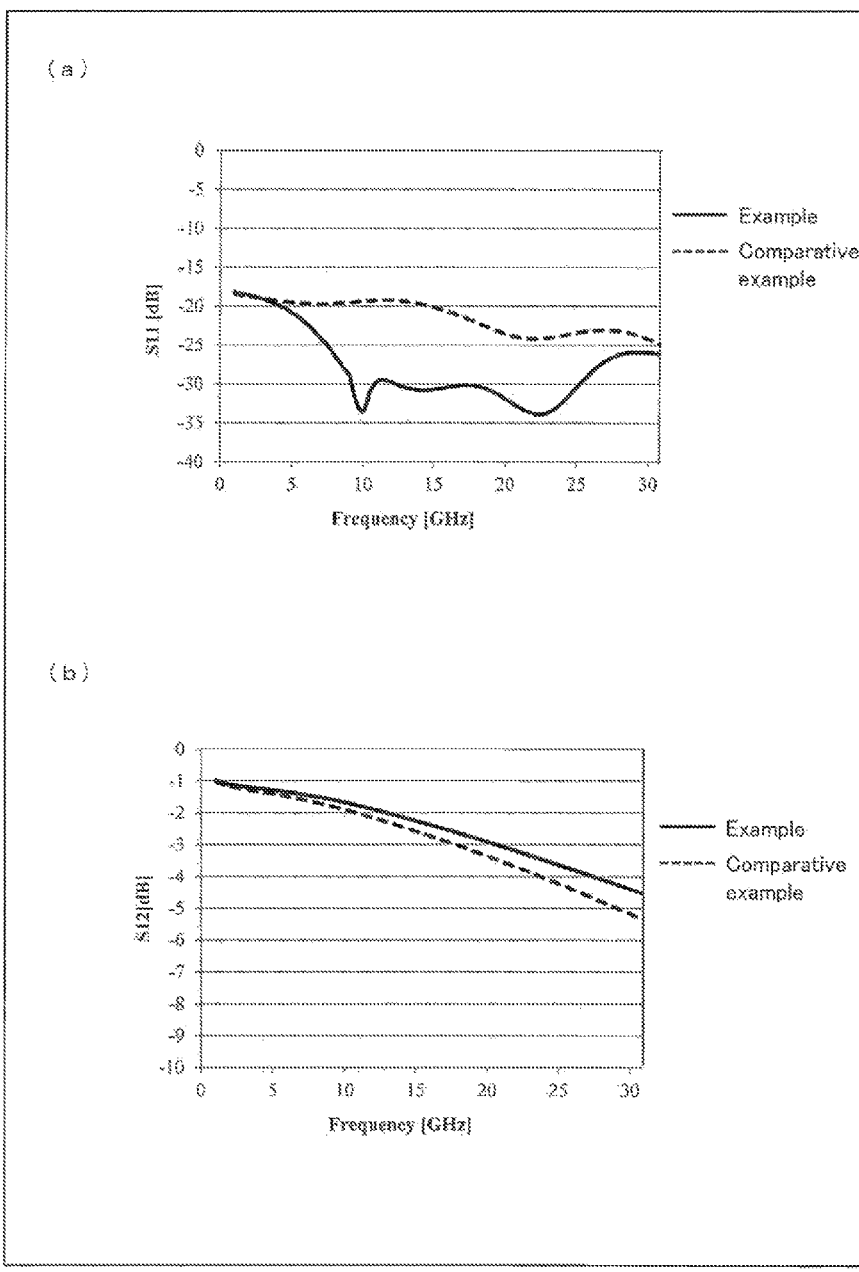

The following description will discuss an effect of the substrate-type optical waveguide 1 with reference to FIGS. 2 and 3.

(a) of FIG. 2 is a plan view of a substrate-type optical waveguide 1 in accordance with an example of the present invention. (b) of FIG. 2 is a plan view of a substrate-type optical waveguide in accordance with a comparative example. The substrate-type optical waveguide 1 in accordance with the example of the present invention is a substrate-type optical waveguide configured such that a distance (i.e., a width of a depletion layer 13c) Dj, in a section Ij, between a P-type semiconductor region 13a and an N-type semiconductor region 13b decreases as a distance from an entrance end surface 1A increases, in a case where the substrate-type optical waveguide 1 is partitioned into four sections I1, I2, I3, and I4 by cross sections orthogonal to the direction in which light propagates through a core 13 (see (a) of FIG. 2). In contrast, the substrate-type optical waveguide in accordance with the comparative example is a substrate-type optical waveguide configured such that a distance D between a P-type semiconductor region 13a and an N-type semiconductor region 13b is uniform (see (b) of FIG. 2).

(a) of FIG. 3 is a graph showing frequency dependencies of reflection coefficients S11 of respective of (i) the substrate-type optical waveguide 1 in accordance with the example (see (a) of FIG. 2) and (ii) the substrate-type optical waveguide in accordance with the comparative example (see (b) of FIG. 2). (b) of FIG. 3 is a graph showing frequency dependencies of transmission coefficients S12 of respective of (i) the substrate-type optical waveguide 1 in accordance with the example (see (a) of FIG. 2) and (ii) the substrate-type optical waveguide in accordance with the comparative example (see (b) of FIG. 2).

(a) of FIG. 3 demonstrates that the substrate-type optical waveguide 1 in accordance with the example of the present invention has a reflection coefficient S11 smaller than that of the substrate-type optical waveguide in accordance with the comparative example. Meanwhile, (b) of FIG. 3 demonstrates that the substrate-type optical waveguide 1 in accordance with the example of the present invention has a transmission coefficient S12 greater than that of the substrate-type optical waveguide in accordance with the comparative example.

[Variation 1]

FIG. 1 illustrates a configuration in which the distance Dj, in a section Ij, between the P-type semiconductor region 13a and the N-type semiconductor region 13b decreases as a distance from the entrance end surface 1A increases. The present embodiment is, however, not limited as such. The substrate-type optical waveguide 1 in accordance with the present embodiment only needs to be configured such that a capacitance Cj in the section Ij increases as the distance from the entrance end surface 1A increases. A configuration to realize the present embodiment is not limited to the configuration illustrated in FIG. 1.

Figure 4:
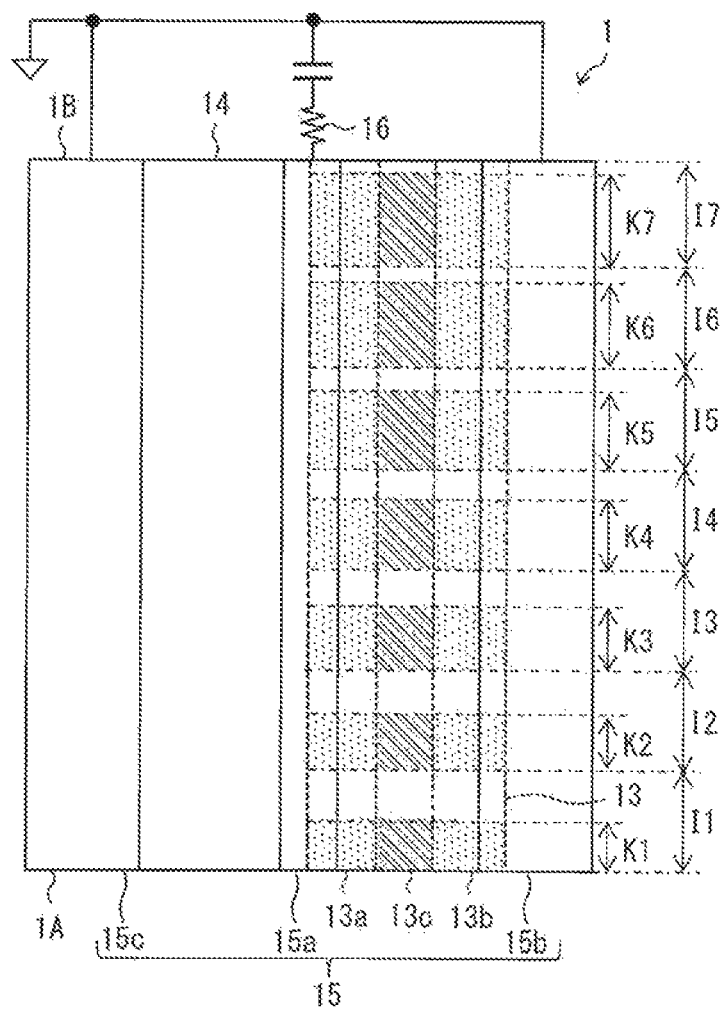
FIG. 4 is a plan view of a substrate-type optical waveguide in accordance with Variation 1.

FIG. 4 is a plan view of a substrate-type optical waveguide 1 in accordance with Variation 1. The substrate-type optical waveguide 1 in accordance with Variation 1 employs a configuration in which (i) a P-type semiconductor region 13a and an N-type semiconductor region 13b are intermittently provided along a direction in which light propagates through a core 13 and (ii) $\alpha j$ (=(length of Kj)/(length of Ij)) increases (i.e., $\alpha 1 < \alpha 2 < \ldots < \alpha 7$) as a distance from an entrance end surface 1A increases, where $\alpha j$ denotes a proportion of the length occupied, in the length of Ij, by the length of Kj, Kj denotes a small section in which the P-type semiconductor region 13a and the N-type semiconductor region 13b are provided, and Ij denotes a section obtained in a case where the substrate-type optical waveguide 1 is partitioned into a plurality of sections I1, I2, ... I7 by cross sections orthogonal to the direction in which light propagates through the core 13. Note that the length of the small section Kj is set to be shorter than a wave (e.g., to 1/10 of the wave). As such, the small section Kj is not affected by a reflection and behaves as an average impedance.

Even in a case where the above configuration is employed, a local capacitance Cj in a section Ij increases as a distance from the entrance end surface 1A increases. It is therefore possible to bring about an effect similar to that brought about by a configuration in which a distance Dj, in a section Ij, between the P-type semiconductor region 13a and the N-type semiconductor region 13b decreases as the distance from the entrance end surface 1A increases.

[Variation 2]

FIG. 1 illustrates the coplanar line 15 configured such that the distance between the traveling-wave electrode 15a and the earth conductor 15b is uniform. The substrate-type optical waveguide 1 in accordance with the present embodiment is, however, not limited to employ such a configuration of the coplanar line 15 illustrated in FIG. 1.

Figure 5:
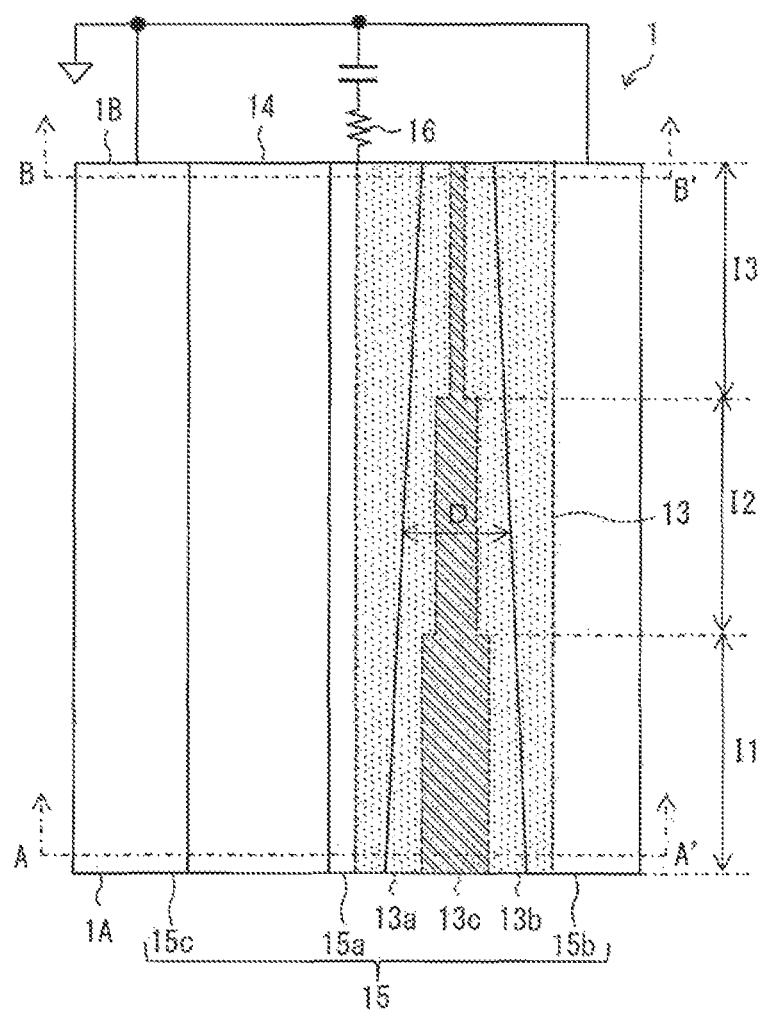
FIG. 5 is a plan view of a substrate-type optical waveguide in accordance with Variation 2.

FIG. 5 is a plan view of a substrate-type optical waveguide 1 in accordance with Variation 2. The substrate-type optical waveguide 1 in accordance with Variation 2 employs a configuration in which a distance D between a traveling-wave electrode 15a and an earth conductor 15b, which constitute the coplanar line 15, decreases as a distance from an entrance end surface 1A increases.

With the configuration, it is possible to reduce a global inductance L (i.e., an average of local inductances Lj of respective sections Ij) of the substrate-type optical waveguide 1. The global inductance L affects a high frequency loss of the substrate-type optical waveguide 1, while maintaining a local inductance L1, in the vicinity of the entrance end surface 1A, of the substrate-type optical waveguide 1. The local inductance L1 affects a characteristic impedance Z of the substrate-type optical waveguide 1. It is therefore possible to reduce the high frequency loss of the substrate-type optical waveguide 1 while maintaining the characteristic impedance Z of the substrate-type optical waveguide 1.

Application Example

Figure 6:
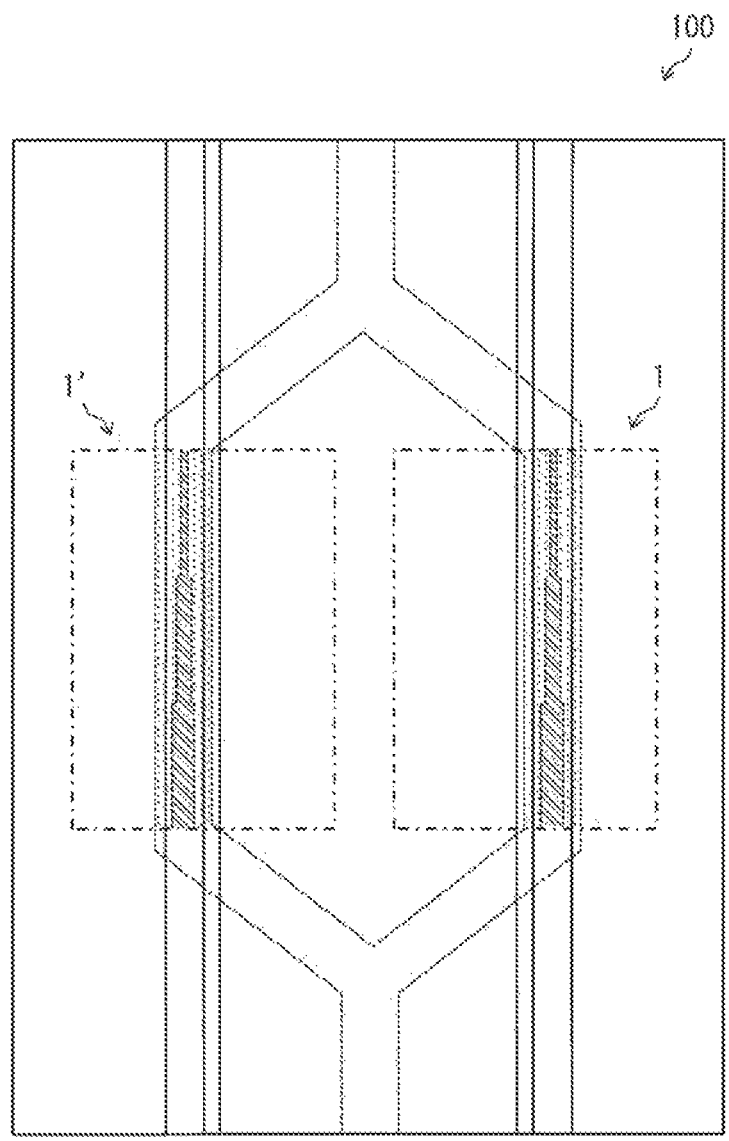
FIG. 6 is a plan view of a substrate-type optical modulator which includes, as a phase modulating section, the substrate-type optical waveguide illustrated in FIG. 1.

The following description will discuss, with reference to FIG. 6, a substrate-type optical modulator 100 which includes the substrate-type optical waveguide 1 as a phase modulating section. FIG. 6 is a plan view of the substrate-type optical modulator 100.

The substrate-type optical modulator 100 is a Mach-Zehnder optical modulator in which beams of light, which are subjected to phase modulation by use of two optical paths, are caused to interfere with each other so that light, which is subjected to intensity modulation, is obtained. The substrate-type optical modulator 100 includes the substrate-type optical waveguide 1 as a phase modulating section which subjects one of beams of branched carrier light to phase modulation. A phase modulating section, by which the other of the beams of the branched carrier light is subjected to phase modulation, is constituted by a substrate-type optical waveguide 1' which has a structure symmetrical to that of the substrate-type optical waveguide 1.

A substrate-type optical waveguide in accordance with an aspect of the present invention includes: a lower cladding; a core, provided on an upper surface of the lower cladding, which has a P-type semiconductor region and an N-type semiconductor region; an upper cladding which is laminated on the lower cladding so that the core is buried in the upper cladding; and a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region, a local capacitance in each of a plurality of sections gradually increasing as a distance from an entrance end surface of the substrate-type optical waveguide increases, in a case where the substrate-type optical wave guide is partitioned into the plurality of sections by cross sections orthogonal to a direction in which light propagates through the core.

The above configuration makes it possible to reduce a global capacitance (i.e., an average of local capacitances of the respective plurality of sections) of the substrate-type optical waveguide. The global capacitance affects a modulation voltage of the substrate-type optical modulator, while maintaining a local capacitance, in the vicinity of the entrance end surface, of the substrate-type optical waveguide. The local capacitance affects a characteristic impedance of the substrate-type optical waveguide. This makes it possible to reduce the modulation voltage of the substrate-type optical waveguide while maintaining the characteristic impedance of the substrate-type optical waveguide. That is, it is possible to reduce electric power consumed by the substrate-type optical waveguide while restraining a reflection of a signal to be inputted to the substrate-type optical waveguide via the coplanar line.

Note that a configuration in which a local capacitance, in each of the plurality of sections, of the substrate-type optical waveguide increases as a distance from the entrance end surface increases can be realized by (i) a configuration in which a distance, in each of the plurality of sections, between the P-type semiconductor region and the N-type semiconductor region decreases as a distance from the entrance end surface increases or (ii) a configuration in which (a) the P-type semiconductor region and the N-type semiconductor region are intermittently provided along the direction in which light propagates through the core and (b) a proportion of a length occupied, in each of the plurality of sections, by a small section in which the P-type semiconductor region and the N-type semiconductor region are provided gradually increases as the distance from the entrance end surface increases.

Each of the above configurations makes it possible to reduce electric power consumption while restraining a reflection of a signal to be transmitted via the coplanar line, which reflection can occur in the vicinity of the entrance end surface.

A substrate-type optical waveguide in accordance with an aspect of the present invention is preferably configured such that a distance between the traveling-wave electrode and the earth conductor decreases as the distance from the entrance end surface of the substrate-type optical waveguide increases.

In the substrate-type optical waveguide, there is a high frequency loss which can be approximated by a formula (1) below, where R, C, and L represent a resistance, a capacitance, and an inductance of the substrate-type optical waveguide, respectively.

[Math. 1]

$$\alpha \approx \frac{1}{2}\omega\sqrt{LC}\left(\frac{R}{\omega L} + \omega RC\right) \quad (1)$$

As is clear from the formula (1), in a frequency domain in which $R/\omega L \ll \omega RC$, the high frequency loss is proportional to the 3/2 power of a capacitance C and is proportional to the 1/2 power of an inductance L.

The above configuration makes it possible to reduce a global inductance (i.e., an average of local inductances of the respective plurality of sections) of the substrate-type optical waveguide. The global inductance affects the high frequency loss of the substrate-type optical waveguide, while maintaining a local inductance, in the vicinity of the entrance end surface, of the substrate-type optical waveguide. The local inductance affects the characteristic, impedance of the substrate-type optical waveguide. It is therefore possible to reduce the high frequency loss of the substrate-type optical waveguide while maintaining the characteristic impedance, on an input side, of the substrate-type optical waveguide.

Furthermore, a speed v of a high frequency signal can be approximated by $v=1/(LC)^{1/2}$. The above configuration therefore makes it possible to keep the speed of the high frequency signal constant. In a case where the speed of the high frequency signal differs from that of light, it is not possible to efficiently subject the light to modulation. Therefore, it is possible to further reduce electric power consumption by causing both of the inductance and the capacitance to vary.

A substrate-type optical waveguide in accordance with an aspect of the present invention is preferably configured such that a terminal resistor is connected to an exit end of the traveling-wave electrode; and a resistance of the terminal resistor matches a characteristic impedance of the substrate-type optical waveguide.

The above configuration makes it possible to (i) restrain, in both of a low frequency domain and a high frequency domain, a reflection which occurs at an entrance end of the traveling-wave electrode and (ii) restrain, in the low frequency domain, a reflection which occurs at an exit end of the traveling-wave electrode. Note that the reflection which occurs, in the high frequency domain, at the exit end of the traveling-wave electrode is subjected to a significant attenuation while propagating through the traveling-wave electrode in an opposite direction. Note that such a reflection therefore causes no problem that a circuit which is followed by the substrate-type optical waveguide is adversely affected.

A substrate-type optical waveguide in accordance with an aspect of the present invention is preferably configured such that the core is of a rib-slab type; and a boundary surface between the P-type semiconductor region and the N-type semiconductor region is located within a rib of the core.

According to the above configuration, a depletion layer is provided within the rib where light which is propagating through the core is unevenly distributed. This makes it possible to efficiently modulate light which propagates through the core.

[Supplemental Note]

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Substrate-type optical waveguide
1A: Entrance end surface
1B: Exit end surface
11: Silicon substrate
12: Lower cladding
13: Core
14: Upper cladding
15: Coplanar line
15a: Traveling-wave electrode
15b: Earth conductor
16: Terminal resistor
100: Substrate-type optical modulator

The invention claimed is:
1. A substrate-type optical wave guide, comprising:
a lower cladding;
a core, provided on an upper surface of the lower cladding, which has a P-type semiconductor region and an N-type semiconductor region;
an upper cladding which is laminated on the lower cladding so that the core is buried in the upper cladding; and
a coplanar line, provided on an upper surface of the upper cladding, which includes (i) a traveling-wave electrode connected to one of the P-type semiconductor region and the N-type semiconductor region and (ii) an earth conductor connected to the other of the P-type semiconductor region and the N-type semiconductor region,
a local capacitance in each of a plurality of sections gradually increasing as a distance from an entrance end surface of the substrate-type optical waveguide increases, in a case where the substrate-type optical waveguide is partitioned into the plurality of sections by cross sections orthogonal to a direction in which light propagates through the core.
2. The substrate-type optical waveguide as set forth in claim 1, wherein:
a distance, in each of the plurality of sections, between the P-type semiconductor region and the N-type semiconductor region gradually decreases as the distance from the entrance end surface of the substrate-type optical waveguide increases.
3. The substrate-type optical waveguide as set forth in claim 1, wherein:

the P-type semiconductor region and the N-type semiconductor region are intermittently provided along the direction in which light propagates through the core; and a proportion of a length occupied, in each of the plurality of sections, by a small section in which the P-type semiconductor region and the N-type semiconductor region are provided gradually increases as the distance from the entrance end surface of the substrate-type optical waveguide increases.

4. The substrate-type optical waveguide as set forth in claim 1, wherein:
a distance between the traveling-wave electrode and the earth conductor decreases as the distance from the entrance end surface of the substrate-type optical waveguide increases.

5. The substrate-type optical waveguide as set forth in claim 1, wherein:
a terminal resistor is connected to an exit end of the traveling-wave electrode; and
a resistance of the terminal resistor matches a characteristic impedance of the substrate-type optical wave guide.

6. The substrate-type optical waveguide as set forth in claim 1, wherein:
the core is of a rib-slab type; and
a boundary surface between the P-type semiconductor region and the N-type semiconductor region is located within a rib of the core.

7. A substrate-type optical modulator employing, as a phase modulating section, a substrate-type optical waveguide recited in claim 1.

* * * * *